Aug. 29, 1939.  E. M. WINEGAR ET AL  2,171,511
PRESS
Filed Jan. 14, 1936  3 Sheets-Sheet 1

INVENTORS
EDMUND M. WINEGAR
AND
FORREST L. DAWES
BY
ATTORNEY

Aug. 29, 1939.　　　E. M. WINEGAR ET AL　　　2,171,511
PRESS
Filed Jan. 14, 1936　　　3 Sheets-Sheet 3

INVENTORS
EDMUND M. WINEGAR
AND
FORREST L. DAWES
BY
ATTORNEY

Patented Aug. 29, 1939

2,171,511

UNITED STATES PATENT OFFICE 2,171,511

PRESS

Edmund M. Winegar, Willoughby, and Forrest L. Dawes, Kent, Ohio, assignors of one-half to The Ohio Rubber Company, Willoughby, Ohio, a corporation of Ohio, and one-half to The Adamson Machine Company, Akron, Ohio, a corporation of Ohio Application January 14, 1936, Serial No. 59,048

9 Claims. (Cl. 18—17)

This invention relates to presses, and more especially it relates to presses of the type employing two or more heated or cooled platens between which molds containing plastic moldable material are confined under pressure.

The invention is of especial utility in connection with vulcanizing presses wherein it is usually necessary to remove the molds from the press in order to open the molds, remove the vulcanized work therefrom, clean or soap the mold sections, and mount new material therein. But one mold can be removed at a time, and the heated condition of the molds makes manual handling thereof unpleasant and frequently hazardous.

The chief objects of this invention are to provide an improved press of the character mentioned which may be more actively employed by the reduction of the time required to unload and reload the same; to obviate manual handling of the molds; to provide for the concurrent unloading and loading of two mold units of the press; to avoid substantial loss of heat from the molds during the loading and unloading thereof; to provide automatically for the opening and closing of the molds; to provide mechanical means for moving the molds out of the press to a position where they may conveniently be unloaded and loaded; to effect the foregoing functions while maintaining the lower mold sections in horizontal position, whereby the mounting of the work therein is facilitated; and to so position the upper mold sections, in the open condition of the molds, that the cleaning or soaping thereof is facilitated. Other objects will be manifest.

Of the accompanying drawings:

Figure 4 is an enlarged sectional view of a yielding support for a platen and mold section, as it appears in the open condition of the press.

Figure 1:
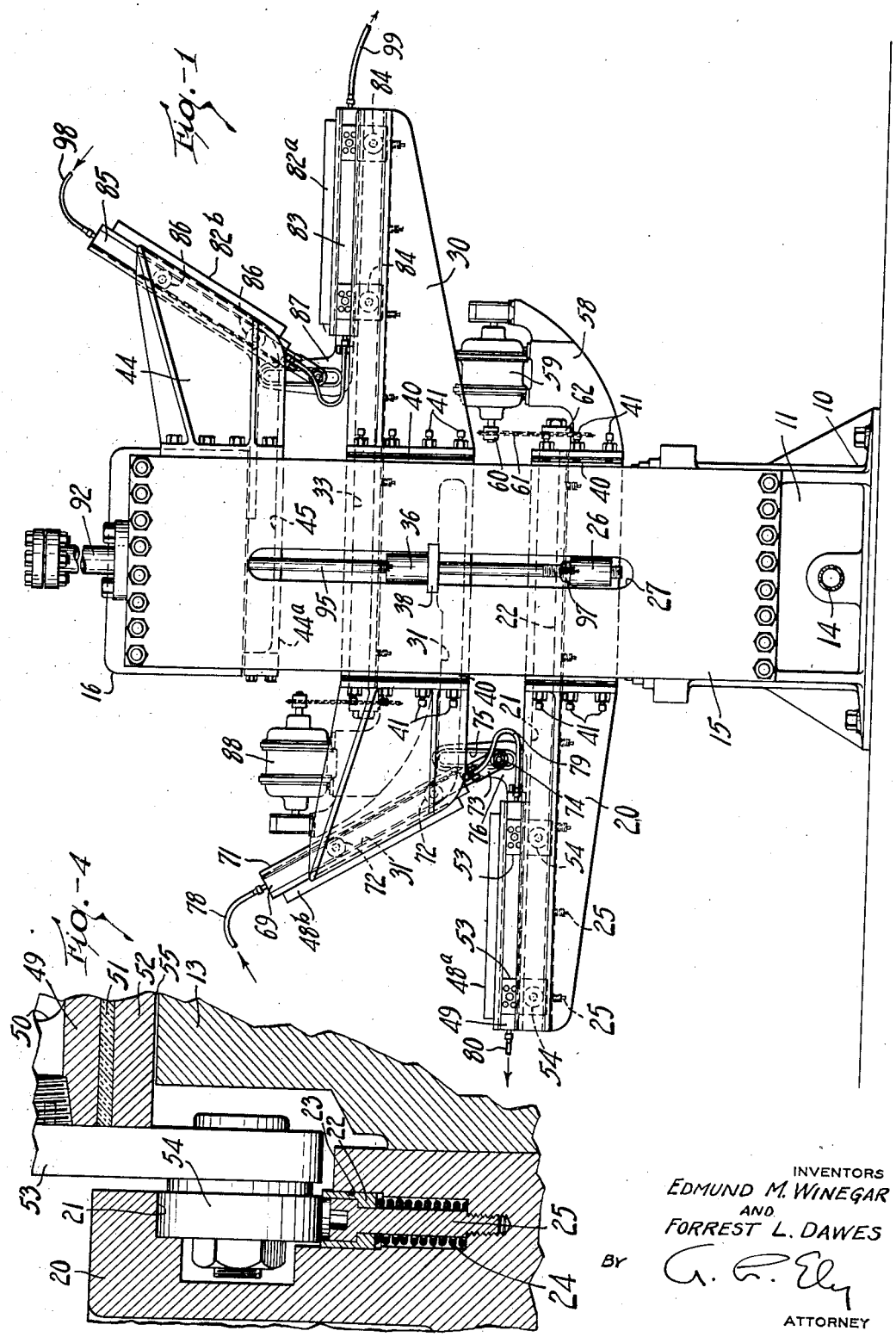
Figure 1 is a side elevation of the improved press, here shown as a vulcanizing press, in inoperative condition, with the molds thereof open and in work-receiving position.

Referring to the drawings, 10 is the base of the press that has a fluid pressure cylinder 11 rising therefrom, 12 is a piston or ram operating in said cylinder, and 13 is a lower press head or bottom bolster mounted upon the top of said ram. Fluid is admitted to and evacuated from the cylinder 11 through an inlet and outlet port 14. Secured to the cylinder 11 on opposite sides thereof are strain plates 15, 15 which extend upwardly and support an upper press head 16 at their upper ends. An intermediate or floating bolster 17 is positioned between the lower bolster 13 and the upper press head 16.

Figure 2:
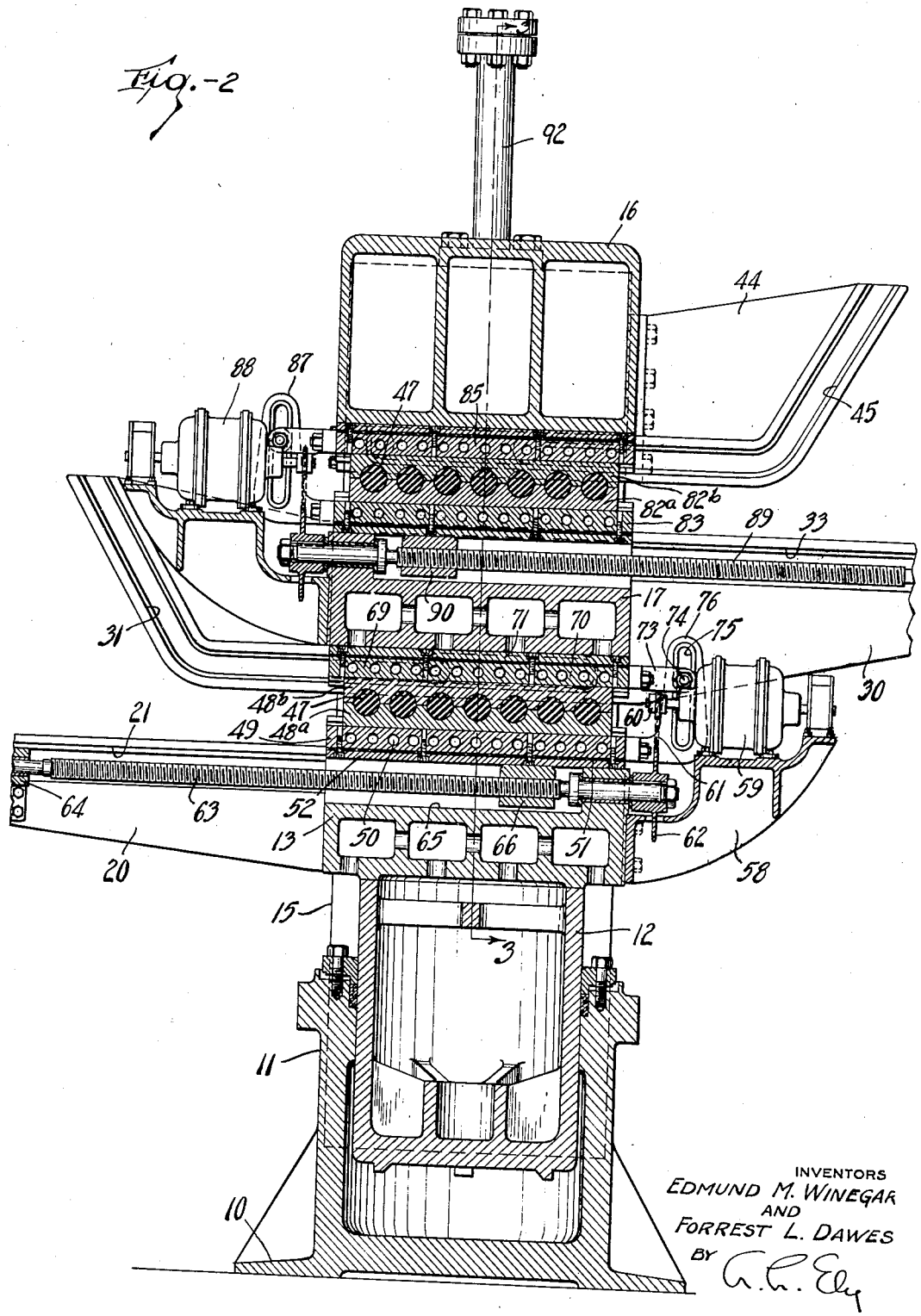
Figure 2 is a vertical section through the press, on a larger scale, in its closed or operative position, and the work therein.

Secured to opposite sides of the lower bolster 13, between the latter and the strain plates 15, are respective runway brackets 20, 20, which brackets extend in parallel relation to points considerably beyond the rear of the press, which is at the left thereof as viewed in Figures 1 and 2. Adjacent their upper margins the brackets 20 are spaced somewhat from the bolster, and have their respective inner faces formed with longitudinally extending, laterally open runways 21, shown best in Figure 4, which runways extend from one end of the brackets to the other. The lower supporting surface of each runway 21 comprises an elongate plate 22 that is seated in a slot or groove 23 and is urged upwardly by compression springs 24, 24 positioned in suitable bores therebeneath, upward movement of the plate being limited by cap screws 25 that are countersunk in the plate and serve to retain it in its slot 23. Each runway bracket 20 is formed with an integral ear or lug 26 that projects laterally outwardly into an elongate vertical slot 27 formed in the adjacent strain plate 15, and each of said lugs is formed with a vertical bore or aperture 28 for a purpose subsequently to be explained.

Secured to opposite sides of the floating bolster 17 are runway brackets 30, 30 that project as far to the front of the press as the brackets 20 extend to the rear thereof, and at the rear of the press project about half the length of the brackets 20. The lower margin of the brackets 30 is somewhat below the bottom of the bolster, and formed on the inner faces of said brackets, adjacent said lower margins, are respective longitudinally extending, laterally open runways 31. The runways 31 extend from a point near the front of the strain plates 15 to the rear of the brackets 30, and extend obliquely upwardly at an angle of 60°, at the rear ends of the brackets, from a point somewhat rearwardly of the rear margins of the strain plates. The runways 31 are similar to runways 21 in the lower bolster except that they are not provided with a yielding lower supporting surface. At their front end portions the runways 31 are of somewhat greater height than they are rearwardly thereof, as is most clearly shown in Figure 1, for a purpose presently to be explained.

Formed in the inner faces of the brackets 30 adjacent the upper margins thereof are respective longitudinally extending runways 33 that extend from a point adjacent the rear margin of the strain plates 15 to the front ends of said brackets. The runways 33 are identical with runways 21 in bolster 20, and include a yielding lower surface comprising a plate 34 and compression springs for supporting the same.

Each runway bracket 30 is formed with an integral ear or lug 36 that projects laterally outwardly into the slot 27 in the adjacent strain plate 15, and each of said lugs is formed with a vertical bore or aperture 37 for a purpose subsequently to be explained. Each of the said slots 27 is traversed by a stop plate 38 that is inset into the opposite walls of the slot, and constitutes a support for the floating bolster 17 when the press is open and in inoperative position, the lug 36 then resting upon said stop plate. Each stop plate is formed with a vertical bore 39 that is axially aligned with bores 28 and 37 in lugs 26 and 36. The outer faces of the runway brackets 20, 30 are disposed close to the inner faces of the strain plates 15 and thus provide lateral stability for the bolsters 13, 17 in a direction transversely of the press. To provide fore and aft stability to the said bolsters, each of the runway brackets is provided with shims 40, 40 that slidably engage the respective lateral margins of a strain plate 15, said shims being adjustably urged against said margins by set screws 41 threaded through slidable flanges on the runway brackets.

Secured to the front marginal face of each strain plate 15 is a runway bracket 44 that projects forwardly about half the distance of the forward portion of brackets 30. Each runway bracket 44 has a rearwardly extending portion 44ª that is disposed adjacent the inner face of the strain plate, immediately below the upper press head 16, the rear end of bracket portion 44 being bolted to the rear margin of the strain plate. The bracket 44 and its rearward extension 44ª are formd with a longitudinally extending runway 45, the front end portion of which extends obliquely upwardly at an angle of 60° to the horizontal. The runway 45 is substantially similar to the runways 31 in brackets 30. The rear end of runways 45 is adjacent the rear margin of strain plates 15, and their rear end portions are of greater height than at other regions, extending to the upper margin of the extensions 44ª.

The press as shown and described is constructed for the concurrent vulcanizing of two mold-fulls of articles, but it will be understood that the construction might be such as to accommodate more than two molds or but one mold at a time without sacrificing all the advantages accruing from the invention. For this reason it is believed that a detail description of but one of the vulcanizing units will suffice, reference being directed to the lowermost unit wherein the work is conventionally shown in the form of a plurality of spherical rubber articles 47, 47 mounted in a divided two-part mold consisting of a lower section 48ª and an upper section 48ᵇ.

Lower mold section 48ª is suitably clamped to the upper face of a platen 49 that is formed interiorly with steam passages 50 in the usual manner and by means of which the platen and mold section are heated. Upon the bottom face of platen 49 is a sheet of heat-insulating material 51, of asbestos or similar material, and underlying the latter is a metal facing plate 52, said face plate and insulating sheet being secured to the platen 49. Secured to each lateral marginal face of platen 49 are two bracket arms 53, 53 that extend downwardly each side of bolster 13 and on the outer faces of their lower ends carry respective rollers 54 that are positioned within the runways 21 of the brackets 20, and rest upon the yielding plates 22 therein. The strength of the springs 24 below the latter is such that they do not compress under the static weight of the mold section and plates, and thus support the face plate 52 in slightly spaced relation above the top of the bolster 13 in the open position of the press, as is most clearly shown at 55, Figure 2. Furthermore, the normal distance between the bottom of yielding plate 22 and the bottom of its slot 23 is greater than the space 55 to the end that in the closed condition of the press the bolster 13 will effect compression of the springs 24 and bear directly against face plate 52 without completely depressing supporting plate 22, with the result that the application of excessive pressure on the rollers 54 is avoided.

The arrangement is such that the mold section 48ª and its platen may be moved along the runway 21 from an operative position within the press, directly over bolster 13, to an inoperative position at the rear of the press in convenient position for loading and unloading. For so moving the mold section and platen, a bracket 58 is mounted upon the front lateral face of bolster 13, and a reversible motor 59 is mounted upon said bracket. The shaft of said motor carries a sprocket 60 that is connected by a sprocket chain 61 to a sprocket 62 mounted upon one end of a screw 63 that is journaled at one end in the bolster 13 and at its other end in a journal bracket 64 (Figure 2) carried by runway brackets 20 at their rear extremities. The top of the bolster 13 is formed with a recess 65 extending from the rear margin thereof to adjacent its front margin for receiving the threaded portion of the screw 63, and a nut 66 through which said screw is threaded, said nut being attached to the bottom face of the face plate 52. There is a little play between the nut 66 and plate 52 to compensate for relative movement between the bolster 13 and plate 52 in the opening and closing of the press, as previously explained. To this end the nut 66 instead of being drawn tightly against the bottom of plate 52 is mounted loosely on the cap screws that secure it to the said plate, as will be apparent from examination of Figure 3 wherein the screw heads are shown in spaced relation to the nut. The mold section 48ª and its platen are moved back and forth in runways 21 by rotation of the screw 63 in opposite directions, and the motor 59 that drives the screw preferably is provided with a magnetic brake by which it may be quickly stopped after the mold section has been moved to determinate position.

The upper mold section 48ᵇ is secured to the bottom face of a steam heated platen 69 that is similar to platen 52 and has an insulating sheet 70 and face plate 71 secured to its top face. Secured to each lateral marginal face of platen 69 are two rollers 72, 72 that are positioned in the runways 31 of the respective runway brackets 30, so that the mold section 48ª and its platen may be moved longitudinally of said runway. For so moving said mold section and platen, means is provided for operatively connecting them with the lower mold section and platen. To this end a pair of bracket arms, such as the bracket arms 73, Figures 1 and 2, are mounted upon the front marginal face of platen 69, the outer end of each of said bracket arms having a roller (not shown) journaled therein upon a spindle 74. Said rollers are positioned within respective vertical slots, such as the slot 75, formed in a pair of arms 76 that are mounted upon the front marginal face of the lower platen 49. The arrangement constitutes a lost motion hinge between the upper and lower platens and mold sections.

Figure 3:
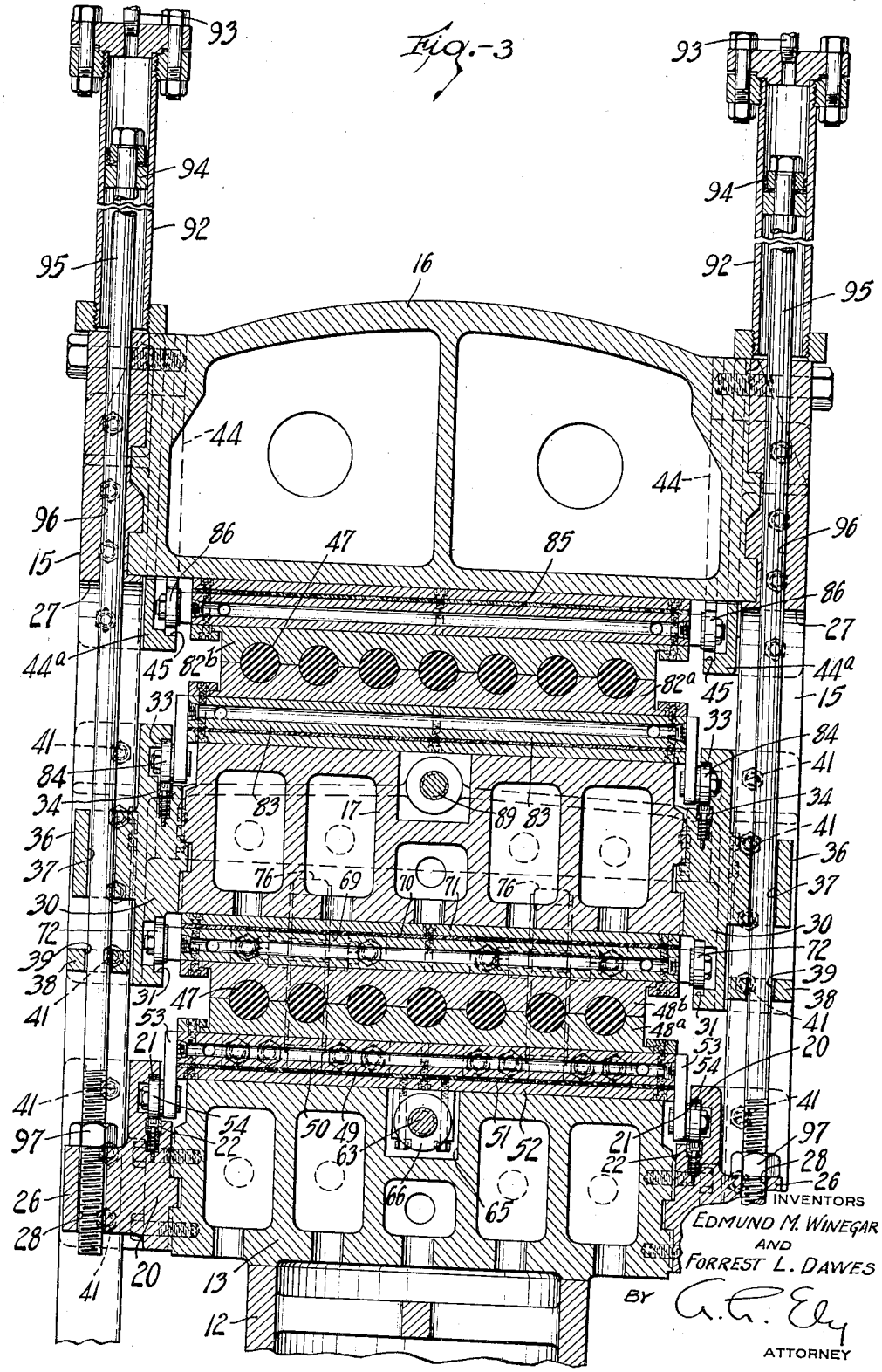
Figure 3 is a section on the line 3—3 of Figure 2.

The slots 75 are of such length as to permit maximum relative movement of the mold sections from and toward each other in the opening and closing of the press. When the mold is open, and the lower mold section and platen are moved along runways 21, the hinge structure described translates the movement of the lower platen to the upper platen, and moves the latter and upper mold section 48$^b$ along the runways 31 in brackets 30. When the upper platen is in the upwardly oblique region at the rear of runways 31, as shown in Figure 1, the upper mold section is so angularly disposed as to facilitate the cleaning and lubricating thereof. When the mold sections 48$^a$, 48$^b$ are within the press and the latter is open, the top of face plate 71 is spaced slightly from the bottom face of the floating bolster 17 so as to avoid sliding friction therewith when the mold and platens are moved laterally into and out of the press. When the press is in closed operative position, as shown in Figures 2 and 3, the upper mold section and platen are lifted upwardly so that face plate 71 is in contact with the bottom of bolster 17. Such relative movement of mold section, platen, and bolster is made possible by the increased height of the runways 31 at their front end portions, which permits the rollers 72 to rise in said runways. The arrangement is such as to relieve said rollers and their journal mechanism of any pressure during the molding and vulcanizing operation.

Steam may be conducted to the platens 49, 69 in any known or desired manner. As shown, steam enters the rear end of upper platen 69 through a flexible inlet pipe 78, passes therefrom at the front thereof through pipe 79 and enters the front end of lower platen 49 to which pipe 79 is connected. The steam has an outlet through flexible pipe 80 at the rear end of platen 49. The arrangement is such that any water of condensation in the upper platen easily drains therefrom when said platen is in the oblique position shown in Figure 1, and is evacuated from the lower platen with the steam that is vented through pipe 80.

The foregoing apparatus constitutes a complete vulcanizing unit, which is duplicated by the apparatus positioned between the floating bolster 17 and the upper press head. Briefly described, the second vulcanizing unit comprises a two-part mold consisting of a lower mold section 82$^a$ and an upper mold section 82$^b$. The lower mold section is secured to a platen 83 that carries rollers 84, 84 mounted in runways 33 of runway brackets 30. Upper mold section 82$^b$ is secured to a platen 85 that carries rollers 86, 86 running in runways 45 of runway brackets 44. Platens 83, 85 are connected to each other by a lost motion hinge shown at 87. The molds and platens are moved laterally into and out of the press, when the latter is open, by means of a reversible motor 88 that drives a screw 89 that is threaded through a nut 90 secured to the bottom of lower platen 83 and having a connection therewith that permits a modicum of relative movement toward and away therefrom. In the open position of the press the face plate of platen 83 is spaced above floating bolster 17 and face plate of platen 85 is spaced from upper head 16. An inlet pipe 98 and an outlet pipe 99 provide steam circulation for the heating of the mold sections 82$^a$, 82$^b$.

Centrally positioned upon the top of each strain plate 15 is a fluid pressure cylinder 92 that has an inlet and outlet port 93 at its top, a piston 94 therein, and a downwardly extending piston rod 95. The latter extends through a vertical bore 96 in the strain plate and into slot 27 therein, through bore 37 in lug 36, through bore 39 in stop plate 38, and through bore 28 in lug 26. The lower end portion of the piston rod is threaded, and receives a nut 97 that rests upon the top of lug 26. The cylinders 92 are arranged to be charged concurrently with the discharge of cylinder 11, in the opening of the press, and serve first to assure the "breaking" or opening of the lower mold, and then to force the ram 12 rapidly downwardly to effect quick opening of the press.

The press is operated by two operators, one working at the rear thereof and another at the front. Obviously the two operators may operate a plurality of the presses since the time required to unload and load the press is relatively brief as compared to the time required for vulcanization of the work.

In the operation of the press, assuming it to be in the open, inoperative position shown in Figure 1, the respective operators mount the unvulcanized articles 47 in the cavities of the mold sections 48$^a$, 82$^a$. Motors 59, 88 are then concurrently driven to drive screws 63, 89 in the proper direction to move the molds from their projected, loading positions into the press, the motors stopping automatically when the mold sections are properly positioned. In moving into the press, upper mold sections 48$^b$, 82$^b$ move into parallelism with their lower mold sections 48$^a$, 82$^a$, the lost motion hinges connecting the sections of the respective molds making this possible while the mold sections are spaced apart from each other. Fluid pressure, usually hydraulic, is then admitted to cylinder 11 and concurrently is vented from the cylinders 92, 92, whereupon the ram 12 rises and with it lower bolster 13 and lower mold section 48$^a$. As soon as mold section 48$^a$ mates with upper mold section 48$^b$ to close the mold upon the work, increasing pressure of the rising ram first carries the face plate 71 of the upper mold section into contact with the lower face of floating bolster 17, this movement being permitted by the increased height of the runways 31 at the region where the rollers 72 at this time are positioned. Next, the bolster 13 moves into contact with face plate 52 of the lower mold section 48$^a$ against the pressure of springs 24. Thus with the mold closed and lost motion taken up, the force of the rising ram is transmitted to the floating bolster 17 and the latter is moved upwardly.

Upward movement of the floating bolster 17 closes the upper mold unit in the same manner as the lower mold unit is closed. As soon as the lost motion mountings of the upper unit are taken up, the parts are in the positions shown in Figures 2 and 3 and the work in both units is subjected to the full hydraulic pressure of the ram 12. The work is then vulcanized in the usual manner by heat from the platens 49, 69 and 83, 85, which platens continuously are kept in heated condition.

After the work is vulcanized the press is opened by reversing the operations just described. Fluid pressure is discharged from the cylinder 11 and at the same time the upper ends of cylinders 92 are charged. As the ram 12 recedes, the piston rods 95 force bolster 13 to follow. The lower mold unit and floating bolster 17 follow downward because of their own weight, thus withdrawing lower mold section 82$^a$ of the upper unit away from upper mold section 82$^b$ to open the upper mold. The several elements continue to move downwardly until lugs 36 of the floating bolster engage stop plates 38 in the strain plates, whereupon the floating bolster comes to rest. Then continued downward movement of the lower bolster 13 separates sections 48$^a$, 48$^b$ of the lower molding unit, and thereafter the ram comes to rest in the bottom of cylinder 11. The motors 59 and 88 are then driven to move the open mold sections and their associated platens laterally out of the press, toward the front and rear thereof, the upper mold sections moving to the oblique positions shown in Figure 1 because of the angular character of the upper runways. Operation of the motors stops when the molds attain determinate open position. The vulcanized articles are then removed from the press. This completes a cycle of operation, which may be repeated as desired.

In practice the charging and discharging of the cylinders 11 and 92, and the starting and stopping of the motors 59 and 88 are effected automatically in determinate time relation by suitable control apparatus, but since the latter is not a part of the present invention no detail description thereof will be given.

The invention reduces the time required for loading and unloading the press and thus effects economy of operation. The mold sections are presented to the operators in most convenient position for loading, unloading, and cleaning, and said operators are not required to handle hot molds. Since the platens and mold sections operate as a unit, and the platens are continuously heated, there is but little loss of heat from the molds during loading and unloading. The invention makes possible the concurrent loading and unloading of two mold units of the same press, and achieves the other objects set out in the foregoing statement of objects.

Although the invention has been described specifically as a vulcanizing press, it will be understood that it is not limited to this particular type of press, but may be embodied in other presses for pressing and shaping moldable material, and the platens thereof may be cooled instead of heated as in the apparatus described.

Modifications may be resorted to without departing from the spirit of the invention or the scope of the appended claims.

What is claimed is:

1. In a press of the character described, the combination of a pair of opposed press heads relatively movable from and toward each other, a pair of parallel runways carried by each of said heads and extending to regions exteriorly of the press, said pairs of runways being in parallelism interiorly of the press and at least one pair thereof diverging angularly out of parallelism exteriorly of the press, mating mold members carried by the respective pairs of runways, and means for impelling the mold members edgewise along said runways in the open condition of the press.

2. In a press, the combination of a pair of opposed press heads relatively movable toward and away from each other, parallel runways carried by each of said heads and extending to regions exteriorly of the press, platens carried by the respective runways, means for heating said platens, mating mold sections secured to the adjacent faces of the respective platens, and means for moving the mold sections and platens edgewise longitudinally of the runways when the press is open, said runways being so constructed that the mold sections and platens have limited movability relatively of the press heads in a direction normal thereto.

3. In a press, the combination of a pair of opposed press heads relatively movable toward and away from each other, parallel runways carried by each of said heads and extending to regions exteriorly of the press, platens carried by the respective runways, means for heating said platens, mating mold sections secured to the adjacent faces of the respective platens, rollers in the respective runways supporting the respective mold and platen structures, means for moving the mold and platen structures longitudinally of said runways when the press is open, means normally holding the platens out of contact with the press heads when the press is open and permitting contact of the press heads with the platens when the press is closed whereby the application of molding pressure to the mold sections through said rollers is avoided, and means on the lower runway for causing the lower mold section and platen to move downwardly as the press opens.

4. In a press, the combination of a pair of opposed press heads movable relatively of each other in a vertical direction, parallel horizontal runways carried by said heads and extending to regions exteriorly of the press, platens carried by the respective runways, means for heating said platens, mating mold sections secured to the adjacent faces of the respective platens, rollers on the mold and platen units supporting them in said runways with the platens in slightly spaced relation to the adjacent press heads, the lowermost of said runways comprising a yielding surface upon which said rollers rest, and means for moving said mold sections and platens longitudinally of said runways when the press is open.

5. A combination as defined in claim 3 in which the upper runways are of increased height at their innermost end portions to permit the upper mold section and its platen to rise relatively of the runways sufficiently for the platen to contact the upper press head.

6. In a press, the combination of a pair of opposed press heads relatively movable vertically toward and away from each other, parallel horizontal runways carried by the lower head and extending to a region exteriorly of the press, a mold structure mounted on said runways, means for moving the mold structure edgewise longitudinally of the runways when the press is open, yielding means supporting the mold structure above the top of the lower press head in the open condition of the press permitting the said head to contact the mold structure when the press is closed, and means engaging said mold structure, in opposition to said yielding means, for limiting the vertical separation of the mold structure and lower press head.

7. In a press, the combination of a pair of opposed press heads relatively movable toward and away from each other, parallel runways carried by each of said heads and extending to regions exteriorly of the press, heated separable mating mold members carried by the respective runways, and means for moving the mold members edgewise longitudinally of the runways when the press is open, said runways being so constructed that the mold members have limited movability relatively of the press heads in a direction normal thereto, the lower runways including overhanging portions that limit the upward movement of the lower mold member relatively of the lower press head.

8. In a press, the combination of a pair of opposed press heads movable relatively of each other in a vertical direction, parallel horizontal runways carried by said heads and extending to regions exteriorly of the press, heated separable mating mold members carried by the respective runways, rollers on the respective mold members supporting them in the runways in slightly spaced relation to the adjacent press heads, the lowermost of said runways comprising a yielding surface upon which said rollers rest and a surface overlying the rollers to assure opening of the mold as the press opens, and means for moving said mold members longitudinally of said runways when the press is open.

9. In a press, the combination of a pair of opposed press heads relatively movable toward and away from each other, a mold comprising separable mating mold members disposed between the press heads, and runways disposed at opposite sides of the press for supporting the respective mold members from opposite margins thereof, said members being movable edgewise along their runways from a molding position within the press to a loading and unloading position disposed laterally thereof, one of said runways at least extending laterally of the press proper and being curved in the region exteriorly of the press.

EDMUND M. WINEGAR.
FORREST L. DAWES.

CERTIFICATE OF CORRECTION.

Patent No. 2,171,511. August 29, 1939.

EDMUND M. WINEGAR, ET AL.

It is hereby certified that error appears in the printed specification of the above numbered patent requiring correction as follows: Page 2, first column, line 32, for the word "slidable" read suitable; and that the said Letters Patent should be read with this correction therein that the same may conform to the record of the case in the Patent Office.

Signed and sealed this 10th day of October, A. D. 1939.

(Seal)

Henry Van Arsdale,
Acting Commissioner of Patents.